Jan. 21, 1969 R. S. BRADFORD 3,423,524

RECORDING SYSTEM

Filed Jan. 5, 1965

INVENTORS
Robert S. Bradford
By Smyth, Roston & Pavitt
Attorneys

United States Patent Office 3,423,524
Patented Jan. 21, 1969

3,423,524

RECORDING SYSTEM

Robert S. Bradford, Tarzana, Calif., assignor to Minnesota Mining and Manufacturing Company, St. Paul, Minn., a corporation of Delaware Filed Jan. 5, 1965, Ser. No. 423,539
U.S. Cl. 178—6.7 14 Claims
Int. Cl. H04n 5/88

ABSTRACT OF THE DISCLOSURE

This invention relates to a system for recording in a radial line on a disc a corresponding position of successive frames of video information signals. The disc has indicia recorded at fixed intervals in an arcuate direction. As the disc rotates, these indicia cause a train of pulses to be produced. The pulses in the train are compared in phase with the horizontal synch pulses in video information signals to produce a control signal having characteristics dependent upon such relative phase. The control signal is used to control the recording of the video information signals on the disc or to control the rotation of the turntable on which the disc is disposed so that a corresponding position on successive frames of information is recorded at a position along a radial line on the disc.

The present invention relates to a system for obtaining recordings of information such as video signals on a storage disc.

In recent years, systems have been constructed for recording high frequency information on a storage medium for purposes of subsequent reproduction of such recorded information. For example, information has been recorded on a magnetic tape where the information comprises video signals having characteristics which, respectively, represent at each instant an image being viewed.

Other types of signals are also recorded on storage media and representing different scientific and mathematical information including the reading of instruments and the values obtained from computations performed by computers. In general, such recordings are made of digital or analog information.

For the recording of high frequency information, the systems now in use generally employ magnetic tape as storage medium. These tapes have, in general, proved fairly satisfactory in recording signals representative of analog or digital information and also in obtaining the reproduction of such information. However, the fidelity of the recording and reproduction is dependent upon the magnetic structure of the tape, so that the magnetic tapes have to be manufactured with considerable precision.

Information recorded on the magnetic tape has a limited density of information packing in that a relatively speaking, large amount of tape is required to store the information represented, for example, by a television program having the duration of approximately half an hour. The limited density of information packing on the tape has resulted from limitations in the speed of response of the magnetic transducer heads which are disposed in juxtaposed relationship to the tape. It has also resulted from limitations in the frequency at which information can be transferred between the magnetic transducer heads and the magnetic layers of the tape.

The system now in use generally dispose the transducing head adjacent to the tape to record information in magnetic form on the tape and to reproduce such magnetic information as electrical signals from the tape. The adjacent relationship between the transducing head and the tape causes the tape to rub occasionally against the head so that the magnetic particles become removed from the tape and are deposited on the head to adversely affect the operation of the head. The magnetic particles removed from the tape also tend to produce an abrasive action on the head so that the response characteristics of the head becomes permanently affected.

A system using discs is principally more desirable than tapes because discs permit to store information in a more compact form than tapes. Specifically, magnetic tape recording involves, so to speak, a one-dimensional tape track running along the extension of the tape. On a disc, however, information can be stored in a more compact manner because the information is stored along a spiral track. Neighboring track portions of the spiral track can be placed in juxtaposed position as closely as permitted by the power of resolution of the recording process and of the consequently resulting permanent change of a physical characteristics of the disc.

In recent years, it has been suggested to provide a transparent disc with a photographic emulsion, for recording thereon, along a spiral track. The emulsion is subjected to a sharply focused beam of radiation energy. For example, the recording means may include elements known from photography providing a light beam having its intensity modulated in accordance with a video signal to be recorded and inscribing a photographic image or reproduction of a video line-by-line scanning signal.

The spiral track will have a pitch which is basically limited only by the resolution of the photographic emulsion and by the extent of the focusing possible for the recording beam. It has been found further that utilization of an electron gun as radiation source in lieu of light permits better focusing and narrowing of the track.

Thus, with such a disc, a recording can be obtained on a two-dimensional basis, in which the width of the track can be made as small as permitted by the recording medium and by the recording process. The playback of such discs usually will involve a scanning light beam focused onto the track and being controlled to follow the spiral path of the track. Here, it is of importance to consider that the recording method and system be not of such a nature that upon playback the scanning beam has to follow the track with the same degree of accuracy as the recording was produced, and that upon deviation of the scanning light from the track the system will not fall out of step.

To be sure, it is basically possible to provide the playback system with an accurate tracking control so as to retain the scanning beam to follow the spiral track; but for home use, it is economically undesirable to equip or have to equip, a "record player" with such an accurate tracking control means. Thus, the recording should be made in such a manner that a scanning light spot may simultaneously cover one, two, or even more juxtaposed track portions, and that a radial deflection of the scanning light beam from the proper track position will not adversely affect the clarity of the picture reproduced.

It is to be considered, that for a video recording, the record must not only include the video signal proper, i.e. the camera signal, but must include also signals representing control pulses for the control of the picture tube scanning process during playback.

As first step for rendering concurrent scanning of more than one track portion of a spiral track permissible, the recording process should be controlled in such a manner that precisely one video frame (or an integral multiple thereof) is recorded upon one revolution of the disk. The frame rate of video picture is 30 picture frames per second. Thus, the recording disc must revolve once in one-thirtieth of a second. This means that along a single spiral track portion having an angle of 360°, there will be recorded 525 scanning lines.

Any given and fixed point in the two-dimensional image field as viewed by the TV camera and as being observed by the optical system thereof and as reproduced in sequential frames, will appear in the video signal at a rate of precisely 30 c.p.s. Upon recording, the video information of such point (i.e. its brightness as viewed by the camera) will appear in radially aligned relationship on the disc. Image points following each other in the camera signal at precisely 30 c.p.s., i.e., at camera frame rate, will be called correlated image points.

Since the given image field in any instant does not vary much from frame to frame, two juxtaposed image scanning lines contain substantially similar information. In other words, consider a radius on the disc containing a complete record, and observing the brightness distribution within an angle sector of angle $d\phi$, at that radius, one will find that the brightness distribution will vary rather gradually along the radius.

Thus, upon playback when the scanning light spot covers say maybe two lines, there is produced an averaging of the video content of two sequentially produced frames. Since this is a staggering process in which each track portion is being scanned twice, no flickering or other adverse phenomenon can be observed.

The condition, however, exists that correlated image points as defined above are in fact arranged and recorded on the disc in strictly radial alignment, so that, for example, a radius drawn from the center of the disc in any direction will run only through correlated image points of the field as viewed by the camera for reproduction on the TV screen. If this geometric relation is not present, then the method of scanning two or more juxtaposedly positioned track portions will fail, because the resulting and reproduced picture will be "averaged" along the scanning line, and will thus be blurred and flicker.

Radial alignment of correlated image points as defined above includes radial alignment of the horizontal synchronizing pulses, for example, at the beginning of correlated scanning lines.

It is apparent that such radial alignment will normally be present only, if the speed of the disc during recording is very constant indeed; if not, a time-displacement error can be defined as time integral over the speed deviation of the disc from accurate speed and taken over a time equal to one-thirtieth of a second times the number of track portions conceivably scanned simultaneously during playback. This time displacement error must be smaller than the resolution and information storing capability of the photographic emulsion on the disc, assuming this power of resolution is used to the utmost extent permissible. This holds true only if the speed variation occurs as non-reversing function. In case of oscillatory speed variations at an oscillation period is shorter than the integration time, the requirements are even more stringent.

One of the principal sources of errors along this line is the fact that the motor driving the turntable which supports the disc for recording has speed variations even when an effort is made to very accurately control the speed. The speed variations usually have a low frequency type spectrum and tend to vary the rate of angular progression of the recording disc from horizontal synch pulse-to-horizontal synch pulse, and from line-to-line in a manner which distorts and disturbs the desired and required radial alignment of correlated image points. This means in particular, that the recordings of the horizontal synch pulses on the disc will not be aligned anymore in radial direction, but will be reflected angularly. Thus, the above-defined time-displacement error is larger than permissible. The invention now is concerned with a recording method and system which insures radial alignment of correlated image points as well as of the horizontal synch pulses, to permit multiple track scanning as outlined above.

The principle involved is to couple the turntable which supports the disc upon which a recording is to be made, with an auxiliary record disc bearing a recording that is representative of the horizontal synch pulse. A pickup device being positioned stationary relative to the auxiliary record disc and scanning same will produce an oscillating signal which in case of an absolutely accurate and constant motor speed will precisely be the desired horizontal pulse frequency, which is normally 15,750 c.p.s. Any phase deviation or momentary frequency deviation of this signal from the normal thus defined, is a precise repliac of a phase deviation of the turntable and of the recording disc thereon, from the desired instantaneous position for purposes of recording. The output of this pickup device can also be defined as representing the passage of fixed angular increments of the recording disc independent from time.

The recording process is now controlled in such a manner that the sequential recording of horizontal synch pulses follows these phase and displacement deviations as metered by the device that observes the auxiliary record carrier. The video information flowing to the recording medium in between two succeeding synch pulses is then placed properly on the disc so as to establish radial alignment of correlated image points in spite of speed variations of the disc.

In its preferred form, the record carrier is an optical disc bearing 525 markers along its periphery. For example, this disc may be a transparent disc having 525 opaque markers spaced regularly around the periphery of the disc and to the utmost extent of accuracy possible. Juxtaposed markers are separated by a translucent portion of similar width. Upon rotation of the turntable, this tachometer disc is observed by a photoelectric pickup device producing on its output side a sinusoidal wave, the frequency and phase of which is an exact replica of the sequential progression of fixed angular increments of the turntable, and of the recording disc thereon.

The video camera observing the viewing field and providing the video camera signals to be recorded, is now being driven by a phase-locked oscillator which is slaved to the frequency of the output of the photo-detector. Preferably, of course, there is interposed between a photodetector and a phase-locked oscillator a pulse shaper and a differentiating stage to accurately define pulses of steep flanks, the phase and frequency of which can be used with precision as an exact replica of the passage of similar angular increments of the recording disc past the point of recording as provided by the recording beam to the disc. Thus, in this case, the video camera is being controlled, as far as the line-by-line scanning is concerned, at a variable rate, and the sequence of scanning lines as they occur at the TV camera output side is not constant, but follows the speed variations of the turntable, so that the camera signal now provided to the recording medium follows the speed variations. The horizontal synch pulses are now placed and recorded on the recording disc in radially aligned relationship thereon, even though the recording disc is subjected to speed variations.

A modification of the system is necessary, if the camera is not available for direct triggering and timing control by the disc recording control system. This situation arises if the video signal to be recorded is derived from a general TV broadcast. In this case, the progressing phase of the horizontal synch and other control pulses of the given video signal is fixed. This phase is now compared with the phase of the pulses derived from the tachometer disc, and an error signal is produced now representing disc speed variations. This error signal can be used to control a variable delay line provided between the source of the video signal and the recording medium (light beam). Alternatively, the error signal can be used to provide additional rotation to the turntable.

While the specification concludes with claim particularly pointing out and distinctly claiming the subject matter which is regarded as the invention, it is believed that the invention, the objects and features of the invention, and further objects, features, and advantages thereof will be better understood from the following description taken in connection with the accompanying drawing, in which:

Figure 1:
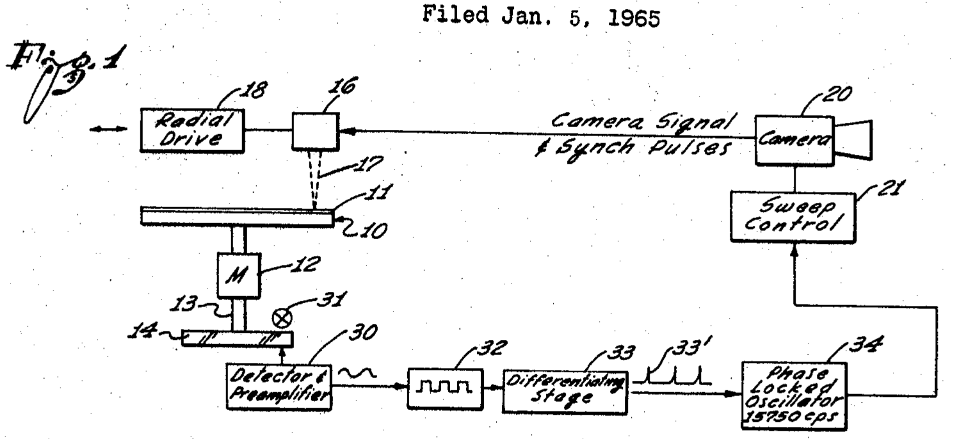
FIGURE 1 illustrates a block diagram and other schematic representation of a disc recording system for video information.

Proceeding now to the detailed description of the drawings, in FIGURE 1 thereof, there is shown a turntable 10 supporting a disc 11 upon which a recording is to be produced. The recording disc 11 preferably comprises a backing member upon which is deposited a layer comprising a photographic emulsion of any conventional type. Since, for purposes of recording, the radiation intensity can be selected to maintain a suitable level and does not depend on ambient light conditions, but since on the other hand, high resolution is of the essence to store a large amount of information on a very small space, the photographic emulsion preferably is of the small grain, high resolution type.

The turntable 10 is driven by a motor 12 at a constant speed, i.e., constant as much as attainable with the aid of, for example, a synchronous motor having sufficient long term stability. The motor 12 is shown to have a driving shaft 13 to which is coupled directly the turntable 10; however, a suitable gear may be interposed for speed adaption. The motor is to have a speed so that the turntable 10 revolves once every one-thirtieth of a second, i.e., it rotates at the normal video frame rate.

Above the recording disc 11, there is disposed a source of energy 16 directing and focusing a radiation beam 17 towards the photographic emulsion layer on disc 11. The radiation beam 17 may be a light beam focused upon the photographic emulsion, or the beam 17 may comprise electrons which are focused electrostatically or magnetically upon the photographic emulsion.

Alternatively, source 16 may be an electromagnetic transducer head with the recording layer on disc 11 consisting of or comprising a magnetizable material. The specific physical process of recording is not of salient importance for practicing the invention; however, an electron beam interacting with a photographic emulsion layer constitutes the preferred form. The recording itself is produced along a track written in spiral form upon the recording, for example, photographic emulsion on disc 11. The recording proper comprises a modulation of the intensity of beam 17. Conventional elements are employed for this purpose. One can use, for example, an electron gun capable of producing a modulated electron beam such as shown in a copending application of Gregg, Ser. No. 181,393 filed Mar. 21, 1962, now U.S. Patent No. 3,350,503 and having a common assignee.

During recording, the source of energy 16 will be shifted in radial direction with respect to turntable 10 or vice-versa, for example, by means of a radial drive 18, so that a spiral recording track is being inscribed on the photographic emulsion layer on disc 11. Devices for producing such a spiral track are, for example, described in greater detail in copending applications of Gregg, Ser. No. 195,218 filed May 16, 1962 or Johnson et al., Ser. No. 192,930 filed May 7, 1962, now U.S. Patent No. 3,361,873.

In the embodiment shown in FIGURE 1, the source of energy 16 receives signals, i.e. video signals to be recorded directly from a television camera 20 of conventional type. The system presently described is of the type in which it is possible to couple the picture-taking process directly with the recording process. For example, a live scene is to be viewed and recorded directly; this will be the normal case for purposes of mass producing video records. Of course, the recording made directly will result in a single master copy from which any number of duplicates can be made.

The camera 20 is comprised of the usual optical-electronic-converter (Vidicon, image Orthicon, etc.) which produces the camera signal in accordance with the electron beam scanning of the instantaneous object field as viewed by the camera lens. In addition, the camera 20 includes a sweep control circuit 21 which is also of conventional design, and which produces synch pulses for normal line-for-line scanning as is conventional for television. This circuit 21, however, does not include a local oscillator for timing the synch pulses. In accordance with the present invention, the sweep control 21 is not operated at a fixed frequency. The camera 20 further includes a mixer to combine synch pulses and camera signal so as to provide the composite video signal to be fed to radiation source 16 for modulating the intensity of beam 17.

Figure 2A:
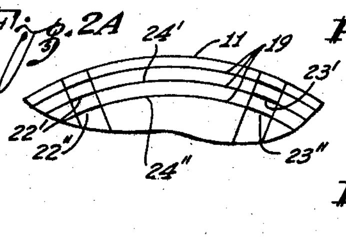
FIGURE 2A illustrates schematically a portion of a disc with video information.
Figure 2B:
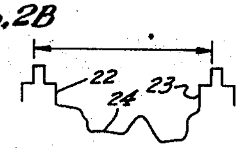
FIGURE 2B illustrates a diagram of a composite video signal of a line to be recorded.

Before proceeding with the description of FIGURE 1, the specific problem arising when making such a recording and briefly outlined above will be more fully explained with reference to FIGURES 2A to 2D. FIGURE 2B illustrates a representative example of the output signal furnished by camera 20. What is shown specifically is a horizontal synch pulse 22 and the succeeding horizontal synch pulse 23 with an envelope 24 of a camera signal in between and representing the brightness variations along any one video scanning line as viewed and transformed by the camera 20. It may further be presumed that the portion of video information illustrated in FIGURE 2B is recorded on a track portion 24′ of spiral track 19 on disc 11 as shown in FIGURE 2A. The arc 24′ defines this track portion. A first area 22′ is a respective preceding track portion and contains the recording of the first one of the horizontal synch pulses 22, and the track portion 23′ is the recording of the next horizontal synch pulse which was pulse 23.

Since the disc 11 makes or, better, is supposed to make precisely one revolution during the recording of one frame, a horizontal synch pulse recording 22″ follows precisely one-thirtieth of a second after the recording of the synch pulse 22, so that recordings 22′ and 22″ are radially aligned. This is the ideal case. Correspondingly, the respectively succeeding envelope recording 24″ now covers, optically speaking, exactly the same image area as was covered by recorded line 24, but observed one-thirtieth of a second later. Recordings or arcs 24′ and 24″ thus represent a series of correlated image points or correlated image scanning lines.

It is well known that video image signals change from image-to-image, i.e., from frame-to-frame, only to a very slight degree, which means that the camera signal recorded along arc 24′ and the camera signal recorded along arc 24″ are almost similar throughout their extension. This means that during subsequent playback of disc 11, the scanning light spot does not have to be restricted to the width of the spiral 19 so as to cover only one line such as 24′ or 24″ at the time, but the scanning light spot may be slightly off-center of the track, or the spot may cover two or even more such parallelly positioned track portions of spiral 19. This, however, is permissible only if the recording areas of synch pulses 22′ and 22″ are exactly radially aligned indeed, which includes the requirement that their respective leading and trailing edges are positioned along radii of disc 11.

It has to be observed that these synch pulse recordings trigger the horizontal scanning sweep of the reproducing TV set. If these recordings 22′ and 22″ are radially misaligned, uncertainty exists as to the time of triggering the sweep for reproducing the recordings in track portions 24′ and 24″. This requirement exists from line-to-line. Thus, it is necessary that the recording areas of the respective next synch pulses of either track portion, i.e. 23′ and 23″ are likewise radially aligned, in that their respective leading and respective trailing edges are also arranged along radii of the circular disc 11. Only this way, it is assured that correlated image points scanned at frame rate and appearing, for example, as recordings in arc 24′ as well as in arc 24″, are also exactly radially aligned. Thus, the envelopes recorded in arc 24′ and 24″ must not exhibit a time-displacement error, but must be radially aligned. Thus, the envelopes recorded in arc 24′ and 24″ aligned as far as all correlated image points are concerned, so that during playback a scanning light beam for playback passing, for example, over the two arcs 24′ and 24″ simultaneously still always covers correlated image points only.

Since the recordings 22′, 24′ and 23′ and the recordings 22″, 24″ and 23″ are made with a time difference of one-thirtieth of a second, this radial alignment of synch pulses and information envelope as defined above can be obtained, if the speed and phase of turntable 10, i.e. of motor 12 can be kept constant with a tolerance below that of the resolution of the information in the track 19. This is practically impossible to achieve. Two cases have to be distinguished: high frequency and low frequency displacement errors. However, either error has the result briefly explained best with reference to FIGURE 2C.

Figures 2C, 2D, 3, 4:
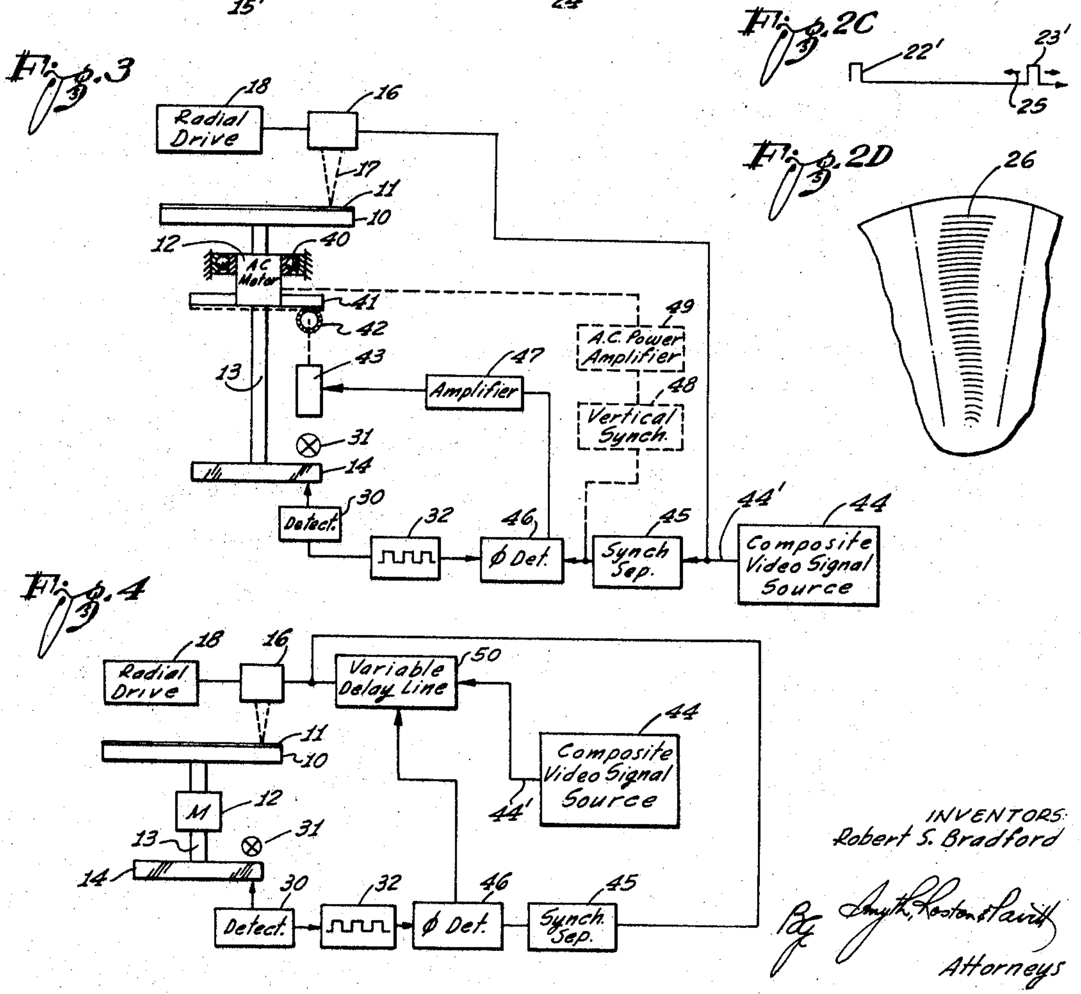
FIGURE 2C illustrates the horizontal synch pulses, separated from the composite signal shown in FIGURE 2B.
FIGURE 2D illustrates schematically a top elevation of a portion of a disc recorded without the invention.
FIGURES 3 and 4 illustrate respectively two modifications of the system shown in FIGURE 1 and to be used alternatively when the synchronizing pulses in a video signal cannot be subjected to any timing control action.

FIGURE 2C illustrates how speed variations of motor 12 affects the recording. The abscissa of FIGURE 2C represents angle displacement of synch pulse records 22′ and 23′ along the spiral track on the record. If the synch pulses are recorded at a fixed rate and if the speed of the record during recording is not constant, then the location of the synch pulse record 23′ will vary in its distance relative to record 22′. This is schematically illustrated by arrow 25 indicating that synch pulse record 23′ may be closer or farther away from the recorded synch pulse 22′ which depends on the sign of the speed deviation.

At speed variations of the motor 12 oscillating at a frequency well above the rate of turntable rotation, the radial misalignment of (correlated) horizontal synch pulses will in the average be not greater than the angular displacement error of directly succeeding horizontal synch pulses along the track. This relatively high frequency phenomenon is accompanied by very small amplitudes (small relative angular displacements) and creates very little concern because any resulting flickering is well below the threshold of noticeability.

The principal problem arises from low frequency and quasi-stationary deviations of the motor speed from normal. In particular, hunting at a rate of 1–2 c.p.s. has been observed. This frequency is well below any mechanical resonance within the system. For such deviations, the displacement error is accumulative from line-to-line over a large number of lines and several frames. The speed deviation does not change its sign over extended periods of frame times, so that the displacement error as defined by the time integral over this speed deviation steadily increases to noticeable values. Displacements up to one-half the length of the recording of a video scanning line have been observed to accumulate after several revolutions. Synch pulses, which should be radially aligned, may appear in a pattern shown in FIGURE 2D. Here, the angular displacement of correlated horizontal synch pulses increases from frame-to-frame. Taking a large section of disc 11, this accumulation and low frequency oscillation of displacement might produce a "wavy" pattern of the synch pulses such as the pattern 26 illustrated in FIGURE 2D. The illustrated lines represent the recording correlated synch pulses which are radially misaligned. During playback such misalignment will result in a noticeable flickering and "waving" of the image on the TV screen.

The invention now permits radial alignment of the horizontal synch pulse record area, and of course, of the envelope recordings pertaining to correlated image scanning lines in succeeding frames, even though the motor 12, the turntable 10 and the record 10 exhibits a time-displacement error due to flutter and hunting of the motor 12.

Figure 1A:
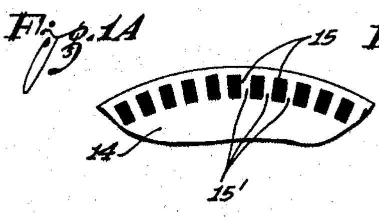
FIGURE 1A illustrates a top elevation of a control disc that is part of the system shown in FIGURE 1.

Returning now to FIGURE 1, the driving shaft 13 of motor 12 bears in addition an optical tachometer disc 14, a portion of which is shown in FIGURE 1A and in top elevation. If there is a gear interposed between motor 12 and turntable 10, the disc 14 then has to be positively coupled to the turntable 10, since disc 14 is to meter the progression of turntable 10 rather than progression motor 12. Preferably the disc 14 is transparent comprising, for example, a glass plate which bears along its periphery similar, contrast producing lines such as 15, respectively separated by translucent portions 15′ of similar width. A stationary lamp 31 is positioned in juxtaposed relationship to disc 14. Of course, proper shielding must be provided to prevent the light from lamp 31 to reach the photographic emulsion on disc 11.

Thus upon rotation of motor 12 and disc 14 and at a stationary point adjacent the periphery of disc 14, there will appear a brightness modulation which is strictly sinusoidal provided the markers 15 respectively separating translucent portions and passing such stationary point, have equal widths throughout the entire periphery of disc 14.

As stated above, the assemblies 10, 11 and 14 make one complete revolution for the time it takes to record one video frame, i.e., one-thirtieth of a second. The number of lines 15 around the periphery of disc 14 is selected to equal the number of scanning lines per video frame which is 525. In order to avoid any misunderstanding, it should be mentioned that FIGURES 1A and 2A are not drawn to a comparable scale. The rate of angularly spanning markers 15 and the total number of markers around the periphery of the disc 14 are the same as the horizontal synch pulse recordings on disc 11. Accordingly, upon rotation of disc 14, the brightness modulation produced will have the line frequency of 15,750 c.p.s. ±, a frequency increment corresponding to motor speed deviations.

A stationary photoelectric detector 30 is positioned to be responsive to the light from lamp 31 as its passes through disc 14. Thus, detector 30 is responsive to brightness modulation produced by markers 15 as they pass alternatingly through the light path to detector 30. The modulation of the light beam from lamp 31 causes detector 30 to produce an electrical sinusoidal output signal. At proper, constant speed of motor 12, this detector output has, as was mentioned above, a frequency of exactly 15,750 cycles per second. However, motor 12 exhibits hunting and other speed and phase variations, which means that the output signal of detector 30 is modulated to include exactly the same frequency and phase variations. For practical purposes, this detecting process can be regarded as instantaneous so that the signal furnished by detector 30 is an instantaneous reproduction of the momentary position and progression of disc 11 including all speed, phase and position errors thereof.

The output wave of detector 30 is fed to a pulse shaper such as, for example, a Schmitt trigger 32 producing a square wave output having the same phase and frequency characteristics as disc 11. The output of Schmitt trigger 32 is fed to a differentiator 33 differentiating, for example, either the leading or the trailing edge of the pulses it receives and thus producing a series of sharply defined pulses 33′, still having the frequency and phase characteristics of the signals of interest.

Next, there is provided an oscillator 34 actually being part of the camera equipment and furnishing the horizontal synch control pulses for the sweep control circuit 21. Thus, camera 20 is operated as far as conventional scanning is concerned by this oscillator 34. However, this oscillator 34 does not produce a fixed and standardized frequency, but it is being phase locked to the pulse train 33'. Phase-locked oscillators are well known, and it thus appears that the output of oscillator 34 is in effect slaved to the tachometer disc 14.

The purpose of this system is to prevent low rate accumulation of displacement errors of the horizontal synch pulse recordings resulting in the radial displacement error outlined above and illustrated by way of example in FIGURE 2D.

It is not necessary to correct high frequency type displacement errors instantaneously as they exist from one horizontal synch pulse to the next one, since such types of displacement error have a small amplitude and by definition have a frequency range well above the frame rate which is beyond the range of noticeability. Within this class of high frequency displacement errors fall errors due to tolerances in the size and spacings of markers 15 on disc 14. It is conceivable to use the pulse train 33' to directly trigger the sweep control 21 and to trigger the sweep control in precise phase synchronism with each pulse of train 33'. It is preferred, however, to provide for an averaging of the phases of pulses 33, so as to eliminate high frequency type phase displacement between succeeding pulses of train 33'. For this reason, the phase-locked oscillator 34 is provided to average out momentary, high rate displacements as between a few succeeding pulses 33', and oscillator 34 phase locks the sweep control 21 only to follow low rate displacement errors of the discs 11 and 14 which, upon accumulation, would result in radial misalignment of the type shown in FIGURE 2D.

The composite video signal which, of course, includes the camera signal and the synch pulses and which is furnished by camera 20, is provided to the source of energy 16 for purposes of recording on the disc 14, as stated above. Since the camera 20 now is in effect controlled by motor 12 through the elements 14, 30, 32, 33 and 34, the camera 20 does not operate any more at a precisely constant scanning rate. This might result in deviations of the normal frame time of one-thirtieth of a second. However, this deviation or variation introduced by control action is likewise so small that it cannot be noticed. The horizontal synch pulses and, therefore, sequential video scanning lines are not provided anymore at the usual constant rate of 62.5 microseconds, but there has been introduced a phase variation in time corresponding to displacement errors due to hunting of motor 12. For example, at a temporarily reduced speed of motor 12, the horizontal synch pulses and sequential lines follow each other at a rate or delay slightly longer than the usual 62.5 microseconds, while at a higher than normal speed of motor 12, the two horizontal synch pulses follow each other somewhat faster than at a delay of 62.5 microseconds.

As a result, the synch pulses and correlated image points are recorded on disc 11 in accurately, radially aligned relationship. It will be appreciated that the system shown in FIGURE 1 can be operated in this manner only as long as it is possible to have the camera 20 controlled from the recording motor 12. Strictly speaking, this is possible only if the facilities are in the vicinity of the scene observed by the camera, i.e. as was mentioned above, when "live" TV pictures are to be recorded directly. The situation is different if, for example, video signals broadcast from a TV station are to be picked up for recording: Home recording or recording of a newscast via Telstar, delayed broadcasting of nationwide distributed programs due to different time zones, etc. In these cases, the video signal furnished by the television station is provided at fixed format, and particularly the time relationship or sequence of horizontal synch pulses within the composite signal is a fixed one. Thus, the rate of providing and producing the video scanning signals cannot be controlled from the recording process directly and different measures have to be taken.

A first possibility for such a situation is shown in FIGURE 3. The basic recording mechanism is the same, i.e., there is the turntable 10, recording disc 11, motor 12, tachometer disc 14, the source of energy 16 producing the recording beam 17, the radial drive 18 for producing the spiral configuration of the recording track, lamp 31, photoelecrtic detector 30, and a pulse shaper 32. The turntable drive mechanism, however, is equipped with the following elements.

As was stated above, the motor 12 is a synchronous motor having, of course, the usual stator and rotor. The rotor is coupled to the output shaft 13 on which is seated the turntable 10 as well as the tachometer disc 13. The stator of the motor 12 is rotatably mounted in a bearing assembly 40. Aditionally, a disc 41 is secured to the stator of motor 12 carrying along its periphery a spur gear meshing with a worm gear 42 driven by a servo type DC motor 43.

The motor 43 when rotating thus displaces the stator of motor 12 which in effect means that an additional rotary component is imparted upon the rotary output of motor 12. Such additional rotation is momentarily added to the rotor speed of motor 12 to either increase or decrease the effective motor speed. The speed and phase of the elements 10, 11 and 14 is varied thereby. The motor 43 is controlled as follows.

Reference numeral 44 designates the source of the composite video signal in general, and it is presumed, as was stated above, that it is not possible to influence directly or indirectly this source of video signals. For example, 44 may be a television receiver producing at its output terminal 44' a demodulated video signal in the form of an envelope type wave train. This output signal of line 44' is first fed to a synch pulse separator 45 producing at its output signals representing the train of horizontal synch pulses as they are derivable from the composite video signal. This train of separated synch pulses is fed to a phase detector 46 and compared therein with the output of Schmitt trigger 32.

It is apparent that any speed variation of motor 12 due to hunting, etc., results in a phase error as between the two pulse rains, derived from the disc 14 via Schmitt trigger 32, on one hand, and from the synch separator 45 on the other hand. This phase detector 46 produces an output (error) signal that is indicative of this phase error, and the error signal is passed, for example, to a DC amplifier 47 to increase the gain of the error signal. The output of amplifie 47 is used to control the reversible motor 43. The amplifier 47 may include compensating circuitry to prevent hunting of the feedback system and to provide fast response with the appearance of any phase error as produced by phase detector 46.

Thus, by way of feedback control, the turntable 10 is now being kept in a phase-locked position to the synch pulses of the video signal source. Particularly, the turntable 10 together with the tachometer 14 are influenced by rotational control of motor 43 counteracting the hunting of motor 12. Since the electromechanical setup 41–42–43 is no instantaneously effective, high frequency deviations are inherently eliminated, and the control effect is restricted to offset accumulative type, slow rate speed variations, producing the radial misalignment of correlated image points on record disk 14 as was described above in detail.

It should be mentioned that the system shown in FIGURE 3 is capable of doing more than merely controlling and eliminating accumulating displacement errors. The source of camera signal 44, as was stated above, may, for example, be a television receiver which is picking up TV signals broadcast from a remote station. In the TV transmitter station, the camera is driven by the local power supply source, i.e., it is phase locked to the mains. The recording system shown in FIGURE 3, particularly motor 12, is driven by a different local power supply source. Thus, there is the possibility that the frequency of the local source and of the power supply of the TV station are not exactly the same, i.e., there may even be a difference in frequency. Since at the TV broadcast station, the vertical synch pulses are directly phase locked to the local 60 c.p.s. power supply, and since the horizontal synch pulses are also derived from there, a permanent phase error will not be observed as far as the pulses from the monostable multivibrator 32 and the synch separator 45 are concerned, and the motor 43 would run continuously to continuously either speed up or slow down the turntable 10, so that the system may accommodate this frequency difference.

Preferably, however, optional equipment is provided to prevent continuous rotation of the stator. The optional equipment as suggested may be comprised of a vertical synch separator 48 connected to separator 45 (or to the source 44), and a filter and power amplifier 49 is connected to separator 48 to provide an A.C. voltage which in effect is a replica of the A.C. supply voltage at the TV broadcasting station. This A.C. voltage will have a frequency of about 60 c.p.s., but may include any frequency deviations as they exist at the remote TV broadcasting station. It is apparent here, that it is immaterial which local power supply frequently contains errors, the frequency at the TV station or the frequency at the recording station, as long as the output of this voltage source 49 is slaved to the vertical synch of the TV broadcast. The synchronous motor 12 is now driven from this new source of A.C. voltage thus providing a first coarse control for the position of the recording disc. Now the feedback loop including motor 12, disc 14, detector 46, etc., does not have to accommodate the system to the differences in the power supply frequencies at the broadcasting station and at the pickup and recording station presently described.

The control action provided by servomotor 43 adjusts the instantaneous phase position of turntable 10 and of the disc 11 thereon relative to the signal train fed to source 16 for modulation of the beam 17. In this respect, it is presumed, of course, that the position of source 16 and of beam 17 is a fixed one. It is within the realm of possibilities to have the motor 43 adjusting the relative angular position of source 16 by pivoting same about an axis which is coaxial with the axis of shaft 13 in which case, of course, the stator of motor 12 would be fixed, but the plate 41 may be used for rotatably mounting the energy source 16 as well as detector 30 for rotation in unison about the axis of shaft 13. Any eccentricity will not reflect on the output of detector 30, but the radial drive 18 must be capable of offsetting any such eccentricity so as to avoid deviation from the intended spiral track.

It will be appreciated that the system of FIGURE 3 is, of course, inherently slow due to the provision of mechanical or, better, electromechanical link comprised of motor 43, worm 42 and the stator control disc 41. Of course, the control action can be made faster by providing the amplifier 47 with sufficient gain. If, however, the residual error resulting from these inherently slow elements impedes proper operation in that not only H.F. variations are averaged out, but slower errors are not properly eliminated, then a different type of system can be employed. This is shown in FIGURE 4.

The assemblies 10, 11, 12, 13, 14, 16 and 18 are the same as aforedescribed and the drive mechanism, in particular, is the same as shown in FIGURE 1. Also, there is provided the detector 30, the pulse shaper 32, the phase detector 46 and the synch separator 45. It is also assumed that the video signal source 44 is not available for direct control action. Now, however, the video signal as derived from the output terminal 44' of source 44 is fed first to a variable delay line 50 prior to the feeding of the signal to the source 16 of radiant energy. The delay of delay line 50 is controlled by the phase detector 46 receiving signals from Schmitt trigger or pulse shaper 32 and from the synch separator 45 to compare the phase of sequential signals thereof. The synch separator 45 receives the video signal from the output side of delay line 50.

Thus, in this case, the horizontal synch pulses and, of course, the camera signal are being subjected to a delay which is a fixed one within the range of controlled action desired as long as the motor 12 runs at rated speed and does not produce a displacement error. A displacement error is picked up as aforedescribed and reflects in a phase difference of the pulses furnished by the detector and pulse shaping assembly 30 and 32 relative to the phase of the synch pulses as they appear at the output of delay line 50 and as sensed by separator 45. This phase error is instantaneously detected by the phase detector 46 and changes the delay for delay line 50, to slow down or to speed up the supply of video signal to the source of energy 16 in accordance with this momentary speed variation of motor 12.

The invention is not limited to the embodiments described above, but all changes and modifications thereof not constituting departures from the spirit and scope of the invention are intended to be covered by the following claims.

What is claimed is:

1. A system for recording video information signals along a spiral track on a disc capable of receiving and storing such signals as modulation of at least one of its physical characteristics, comprising: a turntable for supporting a disc for recording thereon; means for driving said turntable; signal means coupled to said turntable for providing train of pulses representative of progression of fixed angular increments of said turntable; a source of video signals which includes video camera signals and synch pulses; variable delay means connected to be responsive to said video camera signal; a recording control means for providing a recording on a disc when on said turntable during rotation thereof, said recording means being responsive to the output of said variable delay line; circuit means for comparing the phase of the horizontal synch pulse provided at the output side of said variable delay line and of the pulses of the train of pulses and providing an error signal representative thereof; and control means for varying the delay of said delay line in response to said error signal.

2. A system for recording video information signals along a spiral track on disc means capable of receiving and storing such signals as modulation of at least one of its physical characteristics and having indicia recorded at fixed intervals, comprising:

- a source of video signals provided in sequential frames, each frame being defined by a plurality of scanning lines separated from each other and identified by horizontal synch pulses;
- means for supporting the disc means for recording thereon;
- means for driving said supporting means in a rotary direction;
- means for providing a movement of the disc means in a radial direction relative to the recording means;
- signal means responsive to the indicia on the disc means for providing a train of signals representative of the movement of the fixed intervals of said disc means past the signal means;
- means responsive to said video signals for providing a recording of the video signal along the spiral track on the disc means; and
- means for controlling the relative phases of said horizontal synch pulses and of said train of signals to provide a recording of information at a corresponding position on successive frames at a position along a radial line on the disc means.

3. In combiation for recording video signals including synch pulses in a spiral track on rotatable disc means mounted on a turntable and having indicia recorded at fixed intervals:

detector means responsive to the indicia on the disc means for sensing speed and phase of rotation of the said turntable and producing a train of pulses representative of said movement of said indicia past the detector means;

recording means for inscribing a spiral recording track on the disc means when on said turntable;

a source of video signals provided in sequential frames, each frame being defined by a plurality of sequential scanning lines;

means responsive to the synch pulses in the video signals and to the train of pulses for detecting any differences in phase between the video signals and the train of pulses; and means responsive to the detecting means for providing said video signals including synch pulses to said recording means in substantially phase-locked relation as between the synch pulses to be recorded and said trian of pulses to obtain a recording in a radial line on the disc means of a corresponding position in successive frames of the video signals.

4. A system for recording frames of video information signals along a spiral track on a recording disc having indicia recorded at fixed intervals and capable of receiving and storing such signals by modulation of at least one of its physical characteristics, comprising:

a turntable for supporting the disc for recording thereon;

a motor for driving said turntable at a rate so that one revolution of said turntable corresponds to one or an integral multiple of frames of the video signals;

a tachometer disc coupled to said turntable to positively follow the rotation of said turntable, said tachometer disc bearing reproductible recordings of a periodical signal of constant frequency at fixed angular increment-sectors;

signal pickup means responsive to the recorded signal on said tachometer disc to produce a train of pulses representative of the passage of fixed angular increment-sectors of said tachometer disc and of the recording disc when on said turntable;

a source of video signals provided in sequential frames, each frame being defined by a plurality of lines separated from each other and identified by horizontal synch pulses;

means responsive to said video signals for providing a recording thereof along a spiral track on the recording disc when on said turntable;

means for detecting the relative phase of said horizontal synch pulses and of said train of pulses; and means responsive to the relative phase of said horizontal synch pulses and said train of pulses for controlling the recording of the video signals on the recording disc to obtain the recording in a radial line on the recording disc of information at a corresponding position on successive frames of the video signals.

5. A system for recording video information signals along a spiral track on disc means having indicia recorded at fixed intervals and capable of receiving and storing such signals as modulation of at least one of its physical characteristics, comprising:

means for supporting the disc means for recording thereon;

means for driving said supporting means;

means responsive to the indicia on the disc means for producing a train of pulses in accordance with such indicia;

recording control means providing a recording signal for inscribing a spiral recording track on the disc means when on said turntable;

a first signal means providing video signals to said recording control means for recording therewith, which signals include a video camera signal as a sequence of scanning line signals in successive frames and which include further horizontal synch pulses;

means for detecting any phase difference between said horizontal synch pulses and the pulses of said train and providing a control signal representative thereof; and means for controlling the instantaneous phase position as between said supporting means and said recording control means in response to said control signal to obtain a recording in a radial line of information of a corresponding position in successive frames of the video signals.

6. A system for recording video information signals along a spiral track on disc means having indicia recorded at fixed intervals and capable of receiving and storing such signals as a modulation of at least one of its physical characteristics, comprising:

a turntable for supporting the disc means for recording thereon;

a motor for driving said turntable;

first signal means providing a video signal which includes sequential scanning line signals defining successive frames and further includes horizontal synch pulses;

second signal means responsive to the indicia on the disc means for providing a train of pulses respectively representative of the movement of the indicia past the second signal means;

recording control means for providing a recording of video information on the disc means when on said turntable during rotation thereof, said recording means being responsive to said video signals provided by said first signal means for recording thereof;

means responsive to the train of pulses and to the horizontal synch pulses for producing a control signal having characteristics representative of any difference in phase of the train of pulses and the horizontal synch pulses; and control means for controlling the phase of recording of said horizontal synch pulses in response to said control signal to obtain a recording in a radial line of a corresponding position in successive frames of the video signals.

7. An apparatus for recording video signals in a spiral track on rotatable disc means having indicia recorded at fixed intervals in an arcuate direction and mounted on a turntable, the combination comprising:

detector means responsive to the indicia on the disc means for sensing speed and phase of rotation of the turntable to produce a train of pulses representative of said rotation;

a source of composite video signals provided in sequential frames, each frame being defined by a plurality of lines separated from each other and identified by horizontal synch pulses for the different lines;

recording means responsive to the video signals for inscribing the signals in the spiral recording track on the disc means;

means for detecting a phase deviation of said horizontal synch pulses and of said train of pulses to produce a control signal having characteristics representing such deviation; and means for adjusting the relative phase of said turntable and of the recording of said synch pulses and video signals in accordance with the characteristics of said control signal to obtain a recording in a radial line of a corresponding position of successive frames of the video signals.

8. A system for recording video information signals along a spiral track on disc means having indicia recorded at fixed increments in an arcuate direction and capable of receiving and storing such signals as modulation of at least one of its physical characteristics, comprising:

a turntable for supporting the disc means for recording thereon;

a motor for driving said turntable;

first signal means responsive to the indicia on the disc means to produce a train of pulses respectively representative of the passage of fixed angular increments of said disc means on said turntable;

second signal means including a television video camera and a sweep control circuit for such camera for providing a video camera signal which includes sequential scanning line signals and horizontal synch pulses defining the successive line signals to provide successive frames of information;

means for providing a reference signal;

means responsive to the reference signal and to the train of pulses for comparing the relative phases of the reference signal and the pulses in the train to provide a control signal in accordance with such relative phases; and control means for controlling the production of horizontal synch pulses by said sweep control circuit in accordance with the characteristics of the control signal to obtain a recording in a radial line of a corresponding position in successive frames of the video information signals.

9. A system for recording video information signals along a spiral track on disc means having indicia recorded at fixed intervals and capable of receiving and storing such signals as modulation of at least one of its physical characteristics, comprising:

a turntable for supporting the disc means for recording of the video information signals thereon;

means for driving said turntable;

first signal means responsive to the indicia at the fixed intervals for providing a train of pulses respectively representative of the progression of fixed angular increments of said disc means;

second signal means for providing a video signal which includes a camera signal and horizontal synch pulses and successive lines of information defining successive frames;

a phase-locked oscillator providing oscillations corresponding in time to the synch pulses;

means responsive to the oscillations from the phase-locked oscillator and to the train of pulses for producing a control signal having characteristics dependent upon the relative phases of the oscillations from the phase-locked oscillator and the train of pulses; and means for controlling the production of the horizontal synch pulses in the video signal at a rate dependent upon the characteristics of the control signal to obtain a recording in a radial line on the disc means of a corresponding position in successive frames of the video information signals.

10. A system for recording video information signals along a spiral track on disc means having indicia recorded at fixed intervals and capable of receiving and storing such signals as modulation of at least one of its physical characteristics, comprising:

a turnable for supporting the disc means for recording of the video information signals thereon;

a motor for driving said turntable;

signal means responsive to the indicia on the disc means for providing a signal train representative of the passage of fixed angular increments;

a source of video signals provided in sequential frames and in a line-by-line format, there being horizontal synch pulses included in said video signals for separating sequential video scanning lines in said video signals;

means for detecting any phase deviation between said horizontal synch pulses and said signals in said signal train to provide a control signal having characteristics dependent upon such phase deviation; and means for adjusting the relative phase of rotation of said turntable in accordance with the characteristics of said control signal to provide a recording in a radial line on the disc means of a corresponding position in successive frames of the video information signals.

11. A system for recording video information signals along a spiral track on disc means having indicia recorded at fixed intervals and capable of receiving and storing such signals as modulation of at least one of its physical characteristics, comprising:

a turntable for supporting the disc means for recording of the video information signals thereon;

a motor for driving said turntable;

signal means responsive to the indicia on the disc means for providing a signal train representative of the passage of fixed angular increments;

a source of video signals provided in sequential frames in a line-by-line format, there being horizontal synch pulses included in said video signals for separating sequential video signal lines;

means for detecting any phase deviation between said horizontal synch pulses and said signal train to provide a control signal having characteristics dependent upon any such phase deviation; and means for adjusting the movement of said turntable in accordance with the characteristics of the control signal to provide a recording in a radial line on the disc means of a corresponding position in successive frames of the video information signals.

12. A system for recording video information signals along a spiral track on disc means having indicia recorded at fixed intervals and capable of receiving and storing such signals as a modulation of at least one of its physical characteristics, comprising:

a turntable for supporting the disc means for recording thereon;

means for driving said turntable;

first signal means providing a video camera signal which includes sequential scanning lines and further includes horizontal synch pulses;

second signal means responsive to the indicia on the disc means for providing a train of pulses respectively representative of the passage of fixed angular increments of said disc means;

means for comparing the phase of said horizontal synch pulses and of the pulses of said train of pulses to produce an error signal having characteristics representative of said relative phases; and control means for controlling the rotation of said turntable in accordance with the characteristics of said error signal to provide a recording in a radial line of a corresponding position in successive frames of the video information signals.

13. A system for recording video information signals along a spiral track on disc means having indicia recorded at fixed intervals and capable of receiving and storing such signals as a modulation of at least one of its physical characteristics, comprising:

first signal means providing a video camera signal which includes sequential scanning lines and further includes horizontal and vertical synch pulses;

a turntable for supporting the disc means for recording of the video information signals thereon;

a synchronous motor for driving said turntable;

second signal means for producing an A.C. driving voltage for said motor in phase locked relationship to said vertical synch pulses;

third signal means responsive to the indicia on the disc means for providing a train of pulses respectively representative of the movement of said disc means;

means for comparing the phase of said horizontal synch pulses and of the pulses of said train of pulses to produce an error signal having characteristics representative of said relative phase; and control means for controlling the rotation of said turntable in accordance with the characteristics of said error signal to provide a recording in a radial line of a corresponding position in successive frames of the video information signals.

14. A system for recording video information signals along a spiral track on disc means having indicia recorded at fixed intervals and capable of receiving and storing such signals as modulation of at least one of its physical characteristics, comprising:

a source of video signals provided in sequential frames in a line-by-line format, there being horizontal synch pulses included in said video signals for separating sequental video signal lines;

a turntable for supporting the disc means for recording of the video information signals thereon;

a synchronous motor for driving said turntable;

means for producing an A.C. voltage the frequency of which depends on the frequency of the vertical synch signals in said video signal, and feeding said A.C. voltage to said motor;

signal means responsive to the indicia on the disc means for providing a signal train representative of the movement of the disc means;

means for detecting the phase deviation between said horizontal synch pulses and said signal train to provide a control signal having characteristics representative of such phase deviation; and means for adjusting the relative phase of recording of said synch pulses and of the rotation of said turntable in accordance with the characteristics of the control signal to provide a recording in a radial line of a corresponding position in successive frames of the video information signals.

References Cited

UNITED STATES PATENTS

| | | | |
|---|---|---|---|
| 3,317,663 | 5/1967 | Van Dam | 178—6.7 |
| 3,361,873 | 1/1968 | Johnson | 178—6.7 |

ROBERT L. GRIFFIN, *Primary Examiner.*

H. W. BRITTON, *Assistant Examiner.*

U.S. Cl. X.R.

179—100.3; 178—69.5